UNITED STATES PATENT OFFICE.

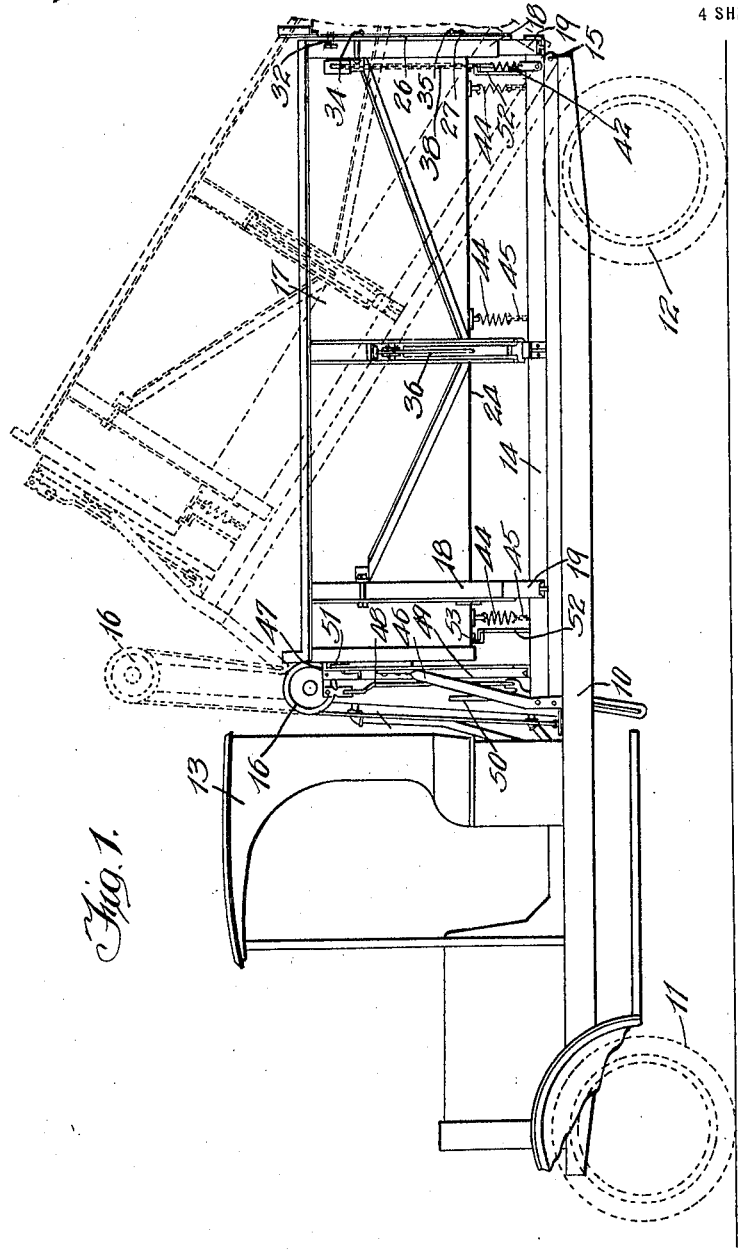

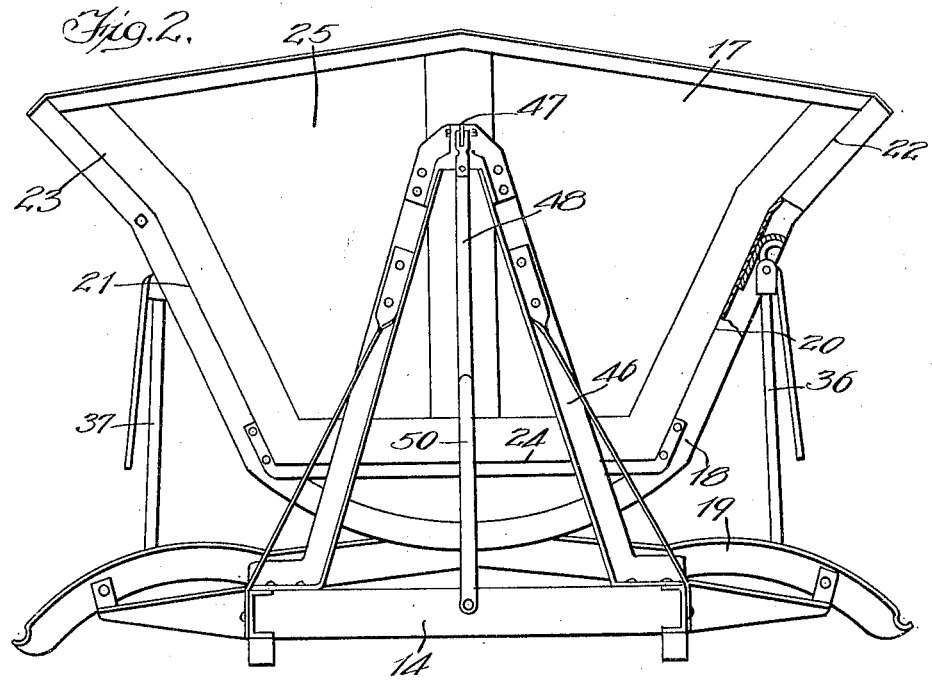
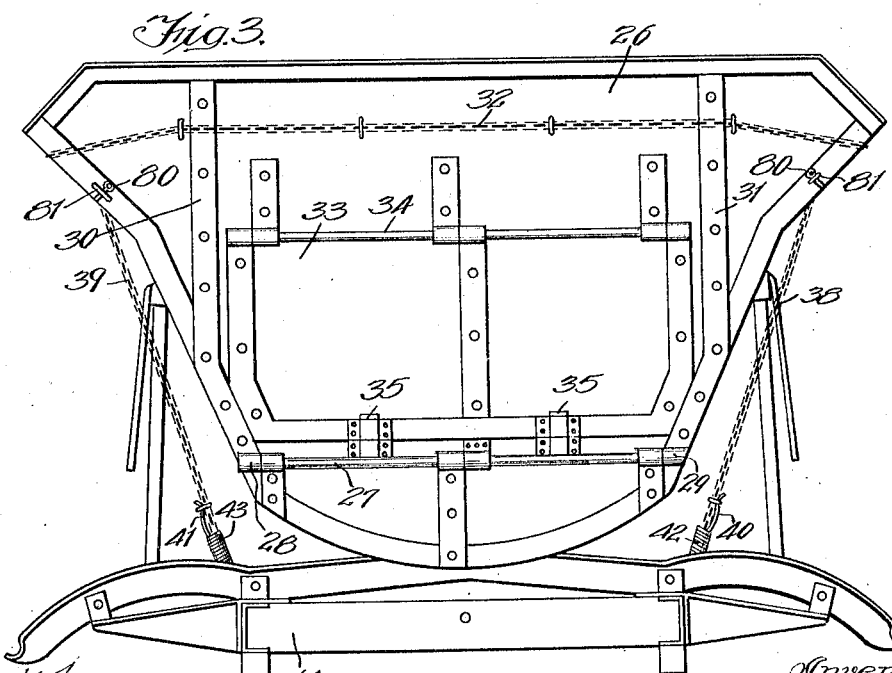

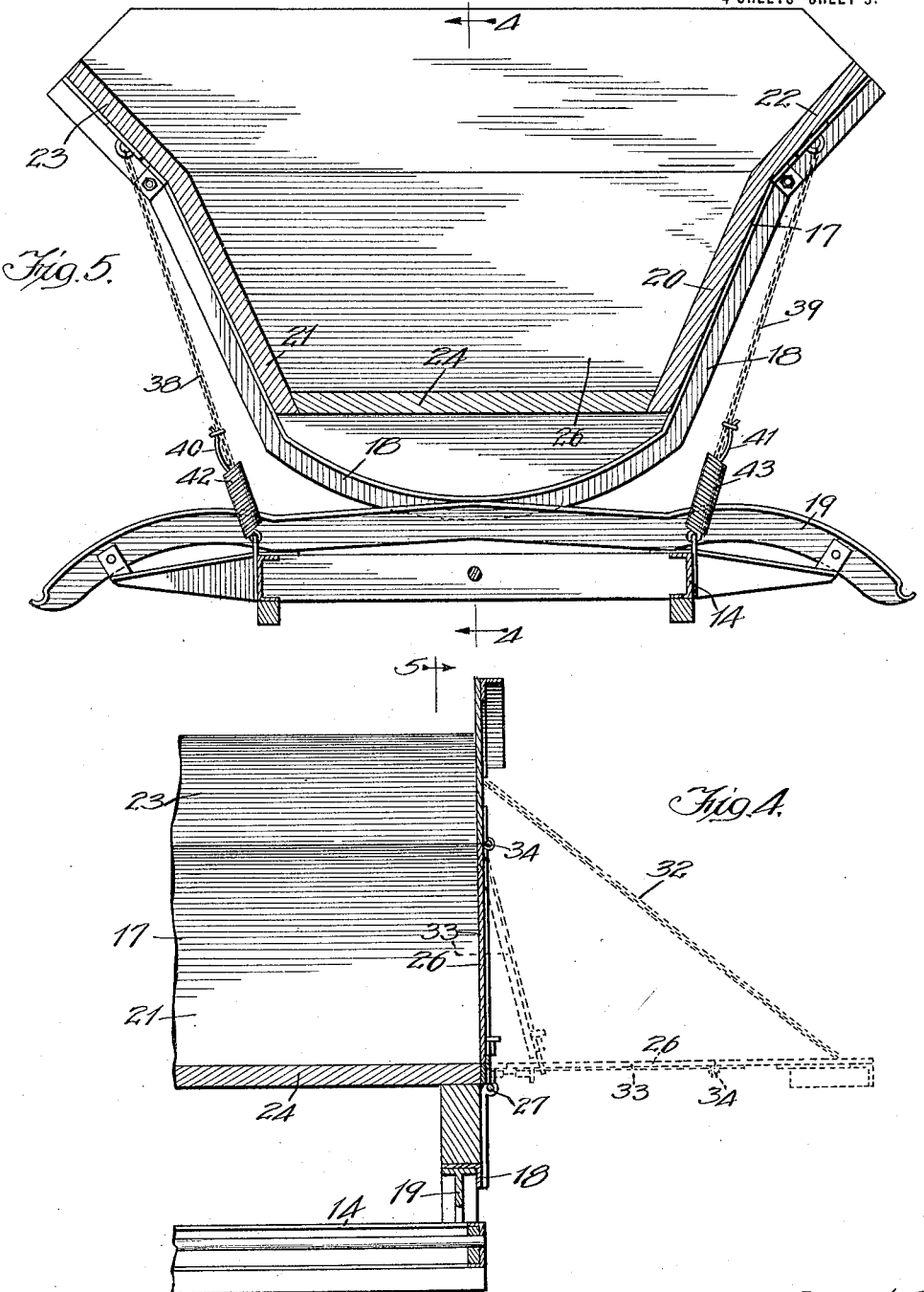

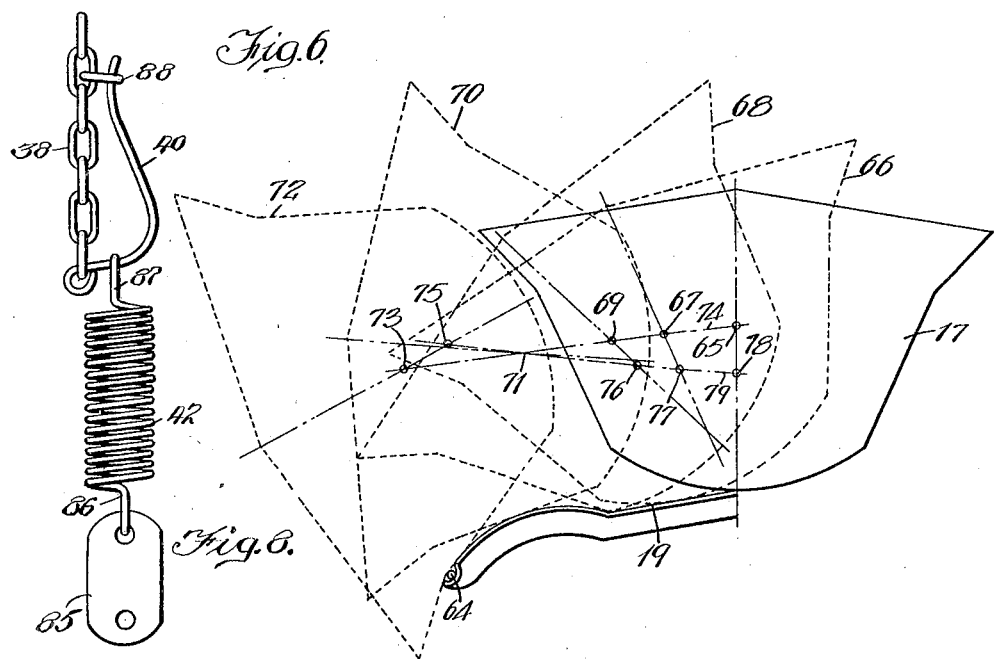
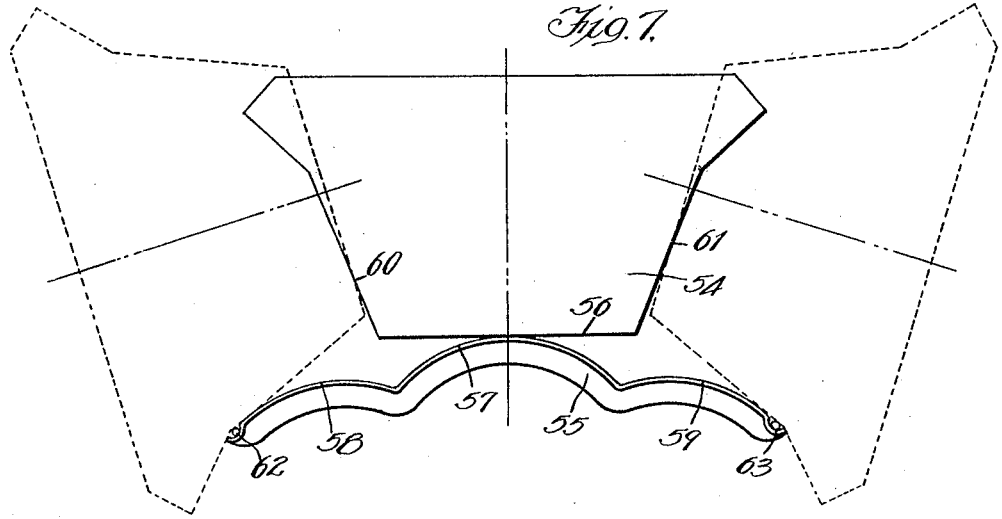

ALBERT P. LEE, OF CHICAGO, ILLINOIS, ASSIGNOR TO LEE TRAILER AND BODY COMPANY, OF CHICAGO, ILLINOIS.

AUTOTRUCK.

1,402,299.

Specification of Letters Patent.  Patented Jan. 3, 1922.

Application filed September 17, 1917. Serial No. 191,666.

*To all whom it may concern:*

Be it known that I, ALBERT P. LEE, a citizen of the United States, residing at Chicago, in the county of Cook and State of Illinois, have invented a certain new and useful Improvement in Autotrucks, of which the following is a full, clear, concise, and exact description, reference being had to the accompanying drawings, forming a part of this specification.

My invention relates to hoppers and more particularly to that kind of hoppers which are of the automatic dumping variety more generally of use in connection with wagons or trucks. My invention concerns itself particularly with the provision of a structure of this nature which is readily convertible from a closed hopper structure to an open express type hopper, the entire structure being such that the hopper automatically dumps to opposite sides of its central position, and in the preferred form the hopper is associated with the structure so that it may also discharge its load in a third direction at right-angles to the aforesaid two sidewise dumping positions.

My invention further concerns itself with the outline of configuration of the hopper and the rail on which it rolls.

My invention further contemplates the provision of a side dumping hopper of this general nature which is so arranged that as the hopper moves from its central charge carrying position to its discharge position with the load in place the center of gravity of the combined hopper and load is gradually lowered in the course of this dumping movement; and in which the center of gravity of the hopper alone is gradually lowered as the hopper returns from its discharge position to its charge carrying position.

I will explain my invention more in detail by referring to the accompanying drawings illustrating means for carrying out my invention, in which—

Fig. 1 is a side view of a truck equipped with my improved hopper and body;

Fig. 2 is an end view of the hopper structure looking back from the cab of Fig. 1;

Fig. 3 is an end view of the opposite end of the hopper and body structure;

Fig. 4 is a fragmentary longitudinal sectional view of the rear portion of the hopper and body structure on line 4—4 of Fig. 5;

Fig. 5 is a sectional view on line 5—5 of Fig. 4;

Fig. 6 is a view illustrating the varying positions of the center of gravity of the loaded and unloaded hopper during the different positions occupied by said hopper, and Fig. 7 is a diagrammatic view of a modified form of hopper and rail outline;

Fig. 8 is a view showing the detailed construction of the yielding stabilizers.

Referring more particularly to Figs. 1, 2, 3, 4, 5 and 6, I show (Fig. 1) an automobile chassis 10 having the wheels 11 and 12 together with the cab 13, which carries a suitable channel iron framework 14. This channel iron framework is pivotally associated with the chassis 10 as shown at 15, and at its opposite extremity is adapted to be raised into a rearward dumping position through the agency of the hoist 16 as shown in dotted lines. The hopper 17 has the hopper rails 18 which co-operate with the truck rails 19 upon which it rolls from the central position shown in Fig. 3 to the dumping position shown in Fig. 6 to either side of its central position.

The general characteristics of this style of construction of the broken back rail and the outer configuration of the hopper are more clearly explained in my application Serial No. 142,419, filed Jan. 15, 1917.

The hopper itself has the flaring sides 20, 21, surmounted by the more acutely flaring upper extensions 22 and 23. The lower floor 24 of the hopper is flat, there being an open space between the floor portion 24 of the hopper and the lower portion of the rail 18, as more clearly apparent from Fig. 5. The front wall 25 of the hopper is preferably designed to remain permanently closed, whereas the rear wall 26 of the hopper is in the form of a door pivoted upon the shaft 27 through the agency of the hinges 28 and 29, these hinges preferably being extended in the form of metallic strengthening strips 30 and 31 respectively. The door 26 as shown more clearly in Fig. 4 may thus be opened to provide a flat bottomed hopper of what is called the express type so that it can be used for carrying lumber or other similar articles. When the door 26 is closed however the hopper is designed to carry loose materials which can be readily discharged from the hopper as it is dumped to either side of its central position or as it is dumped to the rear, as will be presently explained. A suitable chain 32 is designed normally to hold the door 26 in its closed position, and this chain may likewise serve to hold the door in a given open position, as more clearly apparent from Fig. 4. This rear door 26 of the hopper also carries an end gate 33 pivoted upon the shaft 34 and suitably locked in its closed position by the clasps 35. When these clasps are opened the hopper may be dumped rearwardly about the pivot 15 through the agency of the hoist 16 to discharge the contents rearwardly through the gate 33. Suitable outriggers 36 and 37, as explained in my Patent Number 1,253,058 issued Jan. 8, 1918, hold the hopper in its central charge carrying position, and suitable chains 38 and 39 ending in clasps 40 and 41 also hold the hopper in the central position in a yielding manner through the agency of the springs 42 and 43.

The chains, clasps and springs constitute yielding stabilizers whose detailed construction is shown in Fig. 8 and is as follows: Pivotally secured to the lower end of chain 38 is the clasp 40 bent in the form shown. A plate 85 (also shown in Fig. 1) is secured to the frame member 14 by means of a rivet or bolt 89 shown in Fig. 1 and is provided with an opening at its upper end through which passes the end of spring 42. The clasp 40 passes through a loop 87 at the upper end of spring 42 and a loose link 88 on the chain 38 is adapted to engage over the end of clasp 40 to hold it in operative position.

When it is desired to dump toward any one side the stabilizer on the other side must first be released. After the dumping operation and the body has assumed its normal central position, the end of clasp 40 is passed through loop 87 and then turned up to the position shown in Figs. 5 and 8. This movement will draw the chain 38 taut and put the spring 42 under tension, due to the shape of the clasp 40. It will be understood that the stabilizer on the opposite side of the machine is constructed in a similar manner.

The bottom of the hopper also carries springs 44 terminating in chains 45 which limit the dumping position of the hopper, the springs 44 providing sufficient resiliency and recoil to start the hopper on its movement back to its central position after the load has been dumped.

In order further to lock the hopper absolutely in its central position I provide a framework 46 which carries at its upper extremity the pivoted bolt 47, this bolt being operable by the pivotally associated links 48 and 49, the link 49 being rotatable with the handle 50. Thus whenever the handle 50 is swung to either side of its central position (Fig. 2) the link 49 is swung, thereby lowering the link 48 to raise the bolt 47 out of the recess 51 within which it normally finds lodgement, thus to unlock the hopper. The rotation of the handle 50 also rotates the fingers 52 to thereby release them from the co-operating fingers 53 carried by the hopper body. There are thus provided four distinct different means for holding the hopper in its central position. These four means comprise the bolt 47, the fingers 52, 53, the outriggers 36, 37 and the chains 38, 39. Suitable pins 80 (Fig. 3) co-operating with eyes 81 securely hold the door 26 in its closed position.

By referring more particularly to Fig. 7, I show a hopper 54 having a different outline than that shown in Figs. 1 to 6 inclusive, the hopper having an outline such that it does not require a hopper rail of different outline than the hopper itself in order to co-operate with the truck rail 55 upon which it rolls. The flat bottom portion 56 of the hopper rolls upon the central circular portion 57 of the truck rail and the two truck rail wings 58 and 59 are of such an outline as to conform to the sloping sides 60, 61, respectively of the hopper. A gradual rolling movement of the hopper takes place, the rail 55 being so constructed as to conform to the actual outline or configuration of the hopper, thus avoiding the necessity of any special hopper rail construction. Suitable end pivoting points 62 and 63 are provided upon the rail 55 to permit the hopper to pivot when it reaches the limit of its discharge movement.

By referring more particularly to Fig. 6, I show the hopper 17 as cooperating with the rail 19 similarly to the structure disclosed in Figs. 1 to 5, the rail 19 having the pivot point 64 to accommodate for the pivoting of the hopper when it reaches the limit of its stroke. In this Fig. 6 I have shown the hopper in a plurality of different positions which schematically indicate its transition from charge carrying to discharge position when full and its return when empty.

When the hopper is full and in its central position its center of gravity is indicated by the point 65. As the full hopper moves into the dotted position 66 its center of gravity is indicated by the point 67. As the hopper moves into the position 68 its center of gravity is indicated by the point 69. As the hopper moves into the position indicated by 70 its center of gravity is indicated by the point 71, and as the hopper moves into its full dumping position indicated at 72 its center of gravity is indicated at 73. The line 74 thus represents the locus of the points of center of gravity of the filled hopper as it moves from its charge carrying to discharge position. It will be seen that this line slopes downwardly, thus indicating that the center of gravity is gradually lowered, whereby a steady discharge movement of the hopper is automatically brought about. Immediately the hopper has dumped, then the center of gravity of the hopper when it occupies the position 72 is indicated by the point 75. In the position 70 the center of gravity of the empty hopper is at the point 71; in the position 68 the center of gravity is at the point 76; in the position of 66 the center of gravity is at the point 77, and in the position 17 the center of gravity of the hopper is at the point 78. The line 79 joining these points again slopes downwardly showing that the hopper has a tendency when unloaded to roll back to its central charge carrying position. The hopper thus has an automatic discharge movement and an automatic recoil.

From what has been thus described the nature of my invention will be readily apparent to those skilled in the art. Having however thus described certain forms which my invention may take, what I claim as new and desire to secure by Letters Patent is:

1. In a device of the character described the combination with a rolling hopper having fixed side walls and a flat bottom, curved rails underneath the hopper and spaced from said bottom, a rail on which said hopper is adapted to roll from its central charge carrying to its discharge position to either side of its central position whereby the contents of said hopper when tilted to either side are discharged over the top edge of the corresponding side wall, said hopper having an end door which may be opened to form a continuation of the floor of said hopper whereby said hopper is convertible from a closed-ended to an open-ended type.

2. In a device of the character described the combination with a rolling hopper having fixed walls and a flat floor, rails conforming to the walls of the hopper and spaced from said flat floor, rails on which said hopper is adapted to roll from its central charge carrying to its discharge positions to either side of its central position whereby the contents of said hopper when tilted to either side are discharged over the top edge of the corresponding side wall, an end door for said hopper pivoted at its lower edge and adapted to be opened into the plane of said floor to thereby form a continuation of the floor of said hopper whereby said hopper is convertible from a closed-ended to an open-ended type, an auxiliary end gate carried by said door through which said hopper when tilted may discharge its contents of loose material, and means for tilting said hopper rearwardly.

3. In a device of the character described the combination with a rolling hopper having fixed side walls and a flat bottom, a bearing rail around its periphery conforming to its side walls and curved beneath said bottom, a rail coacting with and complementary to the bearing rail and on which said hopper is adapted to roll from its central charge carrying toward its discharge positions to either side of its central position, means whereby said hopper pivots when at the extremity of its movement toward either side on said rail so that said flat bottom swings past a vertical position, a framework carrying said rail, and a centrally located resilient means interposed between said hopper and said framework operative when said hopper has reached either of its limiting discharge positions to initially draw said hopper back toward its central position, said resilient means including a spring and a chain secured to the frame work and the bottom of said hopper.

4. In a device of the character described, a rolling hopper with a flat bottom, a bearing rail around the periphery and spaced from the bottom of the hopper, a rail coacting with and complementary to the bearing rail and on which said hopper is adapted to roll to either side of its central position, and a spring and chain located centrally beneath the hopper and connecting the hopper to the frame to initiate return movement of the hopper from either side position.

In witness whereof, I hereunto subscribe my name this 7th day of September, A. D. 1917.

ALBERT P. LEE.